United States Patent
Marley et al.

(10) Patent No.: US 12,504,035 B2
(45) Date of Patent: Dec. 23, 2025

(54) ADJUSTABLE HEIGHT FASTENER

(71) Applicant: B/E Aerospace, Inc., Winston Salem, NC (US)

(72) Inventors: Scott Marley, Edmonds, WA (US); David P. O'Connor, Seattle, WA (US); Lance Allan McWilson, Falcon, CO (US)

(73) Assignee: B/E AEROSPACE, INC., Winston Salem, NC (US)

( * ) Notice: Subject to any disclaimer, the term of this patent is extended or adjusted under 35 U.S.C. 154(b) by 133 days.

(21) Appl. No.: 18/165,788

(22) Filed: Feb. 7, 2023

(65) Prior Publication Data

US 2024/0263665 A1 Aug. 8, 2024

(51) Int. Cl.
*F16B 37/12* (2006.01)
*B64D 11/02* (2006.01)

(52) U.S. Cl.
CPC ............ *F16B 37/122* (2013.01); *B64D 11/02* (2013.01)

(58) Field of Classification Search
CPC ........ F16B 37/122; F16B 2/18; F16B 37/085; F16B 5/0233; B64D 11/02; B64D 11/0696
See application file for complete search history.

(56) References Cited

U.S. PATENT DOCUMENTS

| | | | | |
|---|---|---|---|---|
| 4,456,206 A * | 6/1984 | Tijssen | ................... | B64D 11/00 410/127 |
| 5,083,727 A * | 1/1992 | Pompei | ................. | B64D 11/04 244/118.6 |
| 6,318,672 B1 * | 11/2001 | Traylor | ................... | B64D 11/00 248/314 |
| 7,374,131 B2 * | 5/2008 | Tiid | ........................ | B64D 9/003 411/398 |
| 8,382,415 B1 * | 2/2013 | Goldbaum | ............ | F16B 39/122 411/383 |
| 8,444,359 B2 * | 5/2013 | Grether | ...................... | B64C 1/20 29/525.02 |
| 9,291,190 B2 * | 3/2016 | Kammerer | ............ | F16B 5/0241 |
| 9,976,583 B2 | 5/2018 | Lopez et al. | | |
| 11,059,590 B2 * | 7/2021 | Heidtmann | ........ | B64D 11/0696 |
| 11,072,438 B2 * | 7/2021 | Benthien | ................. | F16B 37/00 |
| 2005/0117966 A1 | 6/2005 | Steinbeck | | |
| 2006/0137294 A1 * | 6/2006 | Waits, Jr. | ................ | F16B 29/00 52/787.1 |

(Continued)

FOREIGN PATENT DOCUMENTS

| | | | | |
|---|---|---|---|---|
| CA | 2575010 C * | 7/2007 | ............. | B64D 11/02 |
| EP | 2664541 A2 * | 11/2013 | ............... | B64C 1/18 |

(Continued)

OTHER PUBLICATIONS

European Patent Office, European Search Report dated Jun. 13, 2024 in Application No. 24156407.9.

*Primary Examiner* — Assres H Woldemaryam
(74) *Attorney, Agent, or Firm* — SNELL & WILMER L.L.P.

(57) ABSTRACT

An adjustable height fastener may have a fixed receiver connectable to a fixed structure and an extendible member connectable to the fixed receiver at different locations along a first axis. The extendible member may slide relative to the fixed receiver along the first axis and may selectably connect to fix the fixed receiver and the extendible member in a first location along the first axis.

16 Claims, 7 Drawing Sheets

(56) References Cited

U.S. PATENT DOCUMENTS

| | | | | |
|---|---|---|---|---|
| 2012/0174765 A1* | 7/2012 | Kunda | ................. | F16B 37/044 |
| | | | | 89/937 |
| 2013/0017014 A1* | 1/2013 | Wandelt | ................ | F16B 37/085 |
| | | | | 403/343 |
| 2013/0126673 A1* | 5/2013 | Umlauft | .................... | B64C 1/20 |
| | | | | 244/119 |
| 2014/0064827 A1* | 3/2014 | Korenromp | ............ | B64D 11/00 |
| | | | | 403/63 |
| 2015/0322662 A1* | 11/2015 | Schuster | ............... | F16B 5/0233 |
| | | | | 29/890.141 |
| 2017/0350437 A1* | 12/2017 | Benthien | ............... | F16B 37/085 |
| 2021/0190126 A1* | 6/2021 | Schaefer | ................ | F16B 39/282 |
| 2022/0065284 A1* | 3/2022 | Li | ......................... | F16B 37/042 |

FOREIGN PATENT DOCUMENTS

| | | | | |
|---|---|---|---|---|
| WO | 2005095209 | | 10/2005 | |
| WO | 2006102729 | | 10/2006 | |
| WO | WO-2007093322 A1 * | | 8/2007 | .............. B64C 1/18 |
| WO | 2014035241 | | 8/2013 | |

\* cited by examiner

ADJUSTABLE HEIGHT FASTENER

FIELD

The present disclosure relates to fasteners, and more specifically, adjustable height fasteners.

BACKGROUND

Frequently two different articles are desired to be fastened together. However, in many situations, at least a portion of the joining process involves aligning aspects of fasteners in confined spaces or with limited visibility. For instance, aircraft lavatory units or aircraft seats may be removably attachable to mounting rails on an aircraft passenger cabin floor. As the unit or seat is moved into place adjacent to the mounting rail, the unit or seat occludes view of the mounting rail and associated fasteners. This view occlusion also hampers adjustment of the fastener such as to raise, lower, or level the unit or seat. Thus, there is a need for an adjustable height fastener that is readily utilized in confined or view-restricted areas.

SUMMARY

An adjustable height fastener is provided. The fastener may include a fixed receiver and an extendible member. The fixed receiver may have a first attachment face with a first threaded portion and a first slidable portion, the fixed receiver connectable to a fixed structure. The extendible member may have a second attachment face with a second threaded portion and a second slidable portion, the second threaded portion connectable to the first threaded portion to attach the fixed receiver to the extendible member at different locations along a first axis. An attachment of the fixed receiver to the extendible member is released in response to a rotation of the extendible member so that the second threaded portion is disconnected from first threaded portion.

The fastener may include one or more additional feature as well. For example, in various embodiments, the first attachment face is an inward annular surface of an aperture through the fixed receiver. In various embodiments, the second attachment face is an outward annular surface of a portion of the extendible member insertable into the aperture through the fixed receiver. The extendible member may include an adjustment portion that is a boss disposed at an end of the extendible member and configured for grasping with at least one of a hand and a tool to rotate the extendible member to disconnect the second threaded portion from the first threaded portion and to move the extendible member along the first axis. The fastener may include at least one offset sleeve insertable into an aperture of the extendible member and configured to receive a fastener to connect a removable device to the fixed structure. The adjustable height fastener may include a fastener attaching a removable structure to the extendible member, the extendible member spacing the removable structure away from the fixed structure, the spacing variable in response to attaching the fixed receiver to the extendible member at the different locations along the first axis.

In various embodiments, a further adjustable height fastener is provided. The adjustable height fastener may include a fixed receiver and an extendible member. The fixed receiver may be connectable to a fixed structure and may have a first threaded portion and a first slidable portion. The extendible member may have a second threaded portion and a second slidable portion, the second threaded portion selectably (1) attachable to the first threaded portion to fix the extendible member extending away from the fixed receiver a first distance along a first axis, and (2) alignable to the first slidable portion to permit movement of the extendible member further along the first axis.

One or more further aspect may be contemplated. For instance, in various embodiments, the fixed structure is a seat track of an aircraft cabin. A removable structure may be connected to at least one of the extendible member and the fixed receiver and may be spaced apart from the fixed structure by the combination of the extendible member collar and the fixed receiver. The removable structure may be an aircraft lavatory. The removable structure may be an aircraft passenger seat. A fastener may be receivable into a bracket associated with a removable structure connectable to the fixed structure by the adjustable height fastener. The extendible member may include an adjustment portion at an end of the extendible member, the adjustment portion comprising a hexagonal bolt head. At least one sleeve may be inserted into an aperture of the extendible member to receive a fastener for attaching an aircraft lavatory to the fixed structure by the adjustable height fastener. In various embodiments, the fixed structure is an aircraft seat track.

A removable aircraft lavatory system is provided. The system may include a modular aircraft lavatory and a plurality of adjustable height fasteners. The modular aircraft lavatory may be configured for installation and removal from an aircraft passenger cabin having a plurality of floor-mounted seat rails. The plurality of adjustable height fasteners may be placed between the modular aircraft lavatory and the plurality of floor-mounted seat rails and may be configured to attach the modular aircraft lavatory to the plurality of floor-mounted seat rails.

Each adjustable height fastener of the plurality of adjustable height fasteners may include a fixed receiver having a first attachment face with a first threaded portion and a first slidable portion. The fixed receiver may be connectable to a floor-mounted seat rail of the plurality of floor-mounted seat rails. Each adjustable height fastener may include an extendible member having a second attachment face with a second threaded portion and a second slidable portion. The second threaded portion may be connectable to the first threaded portion to attach the fixed receiver to the extendible member at different locations along a first axis extending away from a floor of the aircraft cabin. The different locations may include a first location, wherein the first location is selected to space the modular aircraft lavatory away from the floor-mounted seat rail.

One or more further aspect may be provided. For instance, in various embodiments, the first attachment face is an inward annular surface of an aperture through the fixed receiver. The second attachment face may be an outward annular surface of a portion of the extendible member insertable into the aperture through the fixed receiver. The extendible member may further include an adjustment portion comprising a boss disposed at an end of the extendible member and configured for grasping with at least one of a hand and a tool to rotate the extendible member to disconnect the second threaded portion from the first threaded portion and to move the extendible member along the first axis to adjust a spacing of the modular aircraft lavatory away from the floor-mounted seat rail. In various embodiments, at least one offset sleeve is insertable into an aperture of the extendible member and configured to receive a fastener to connect the modular aircraft lavatory to the floor-mounted seat rail.

The forgoing features and elements may be combined in various combinations without exclusivity, unless expressly indicated herein otherwise. These features and elements as well as the operation of the disclosed embodiments will become more apparent considering the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

Figure 1A:
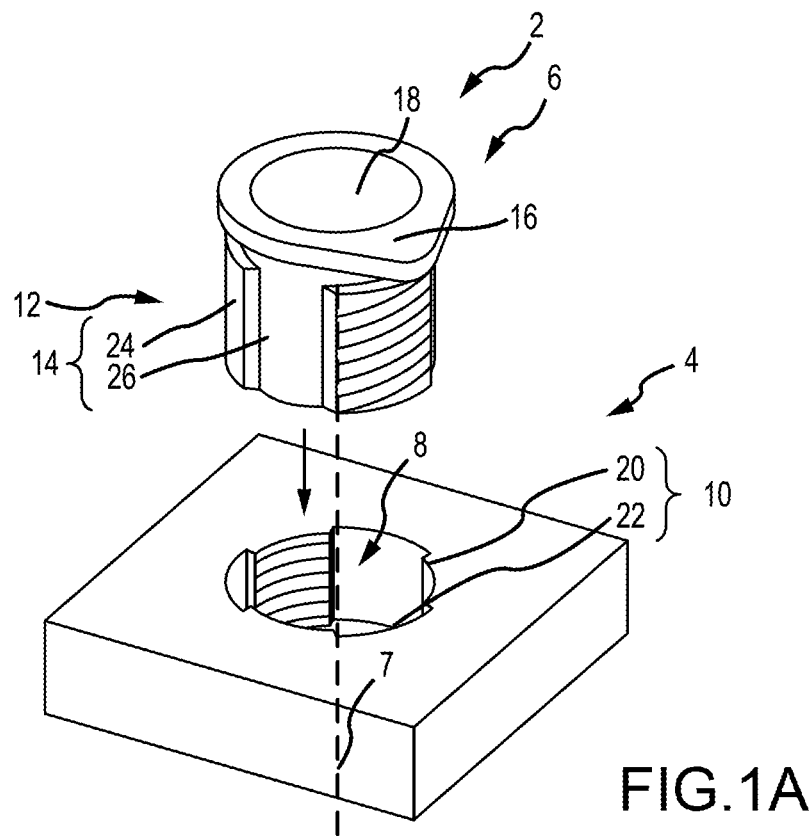
FIGS. 1A-B illustrates exploded views of adjustable height fasteners, in accordance with various embodiments.
Figure 1B:
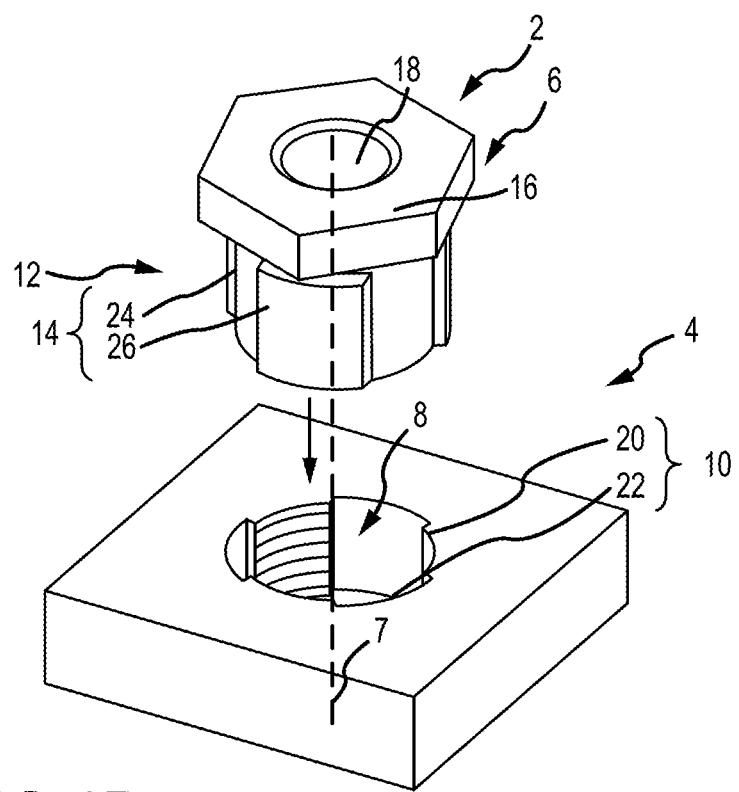
Figure 1C:
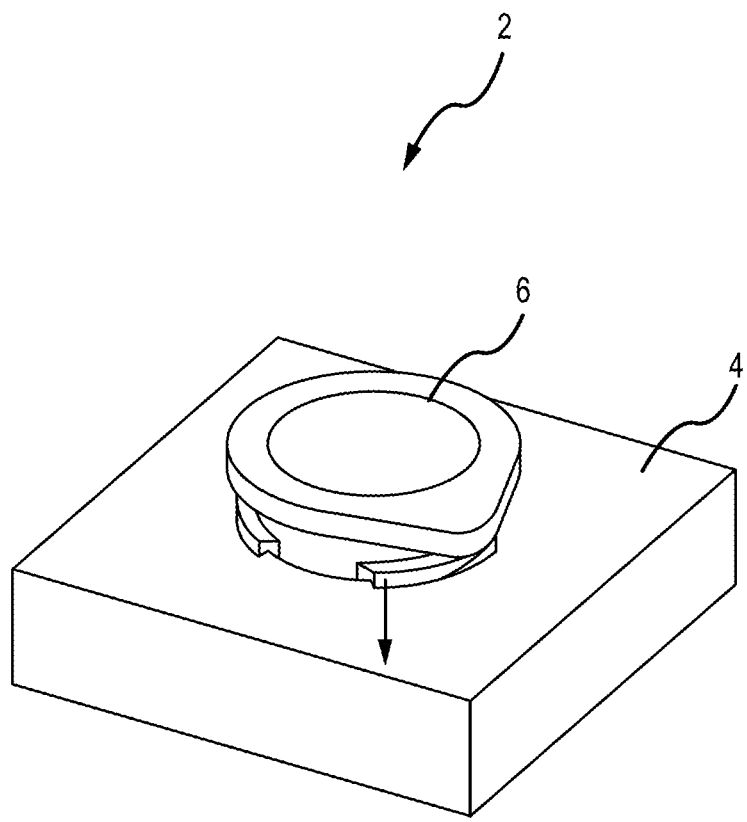
FIG. 1C illustrates a view of an adjustable height fastener with the extendible member inside the fixed receiver, in accordance with various embodiments.
Figure 1D:
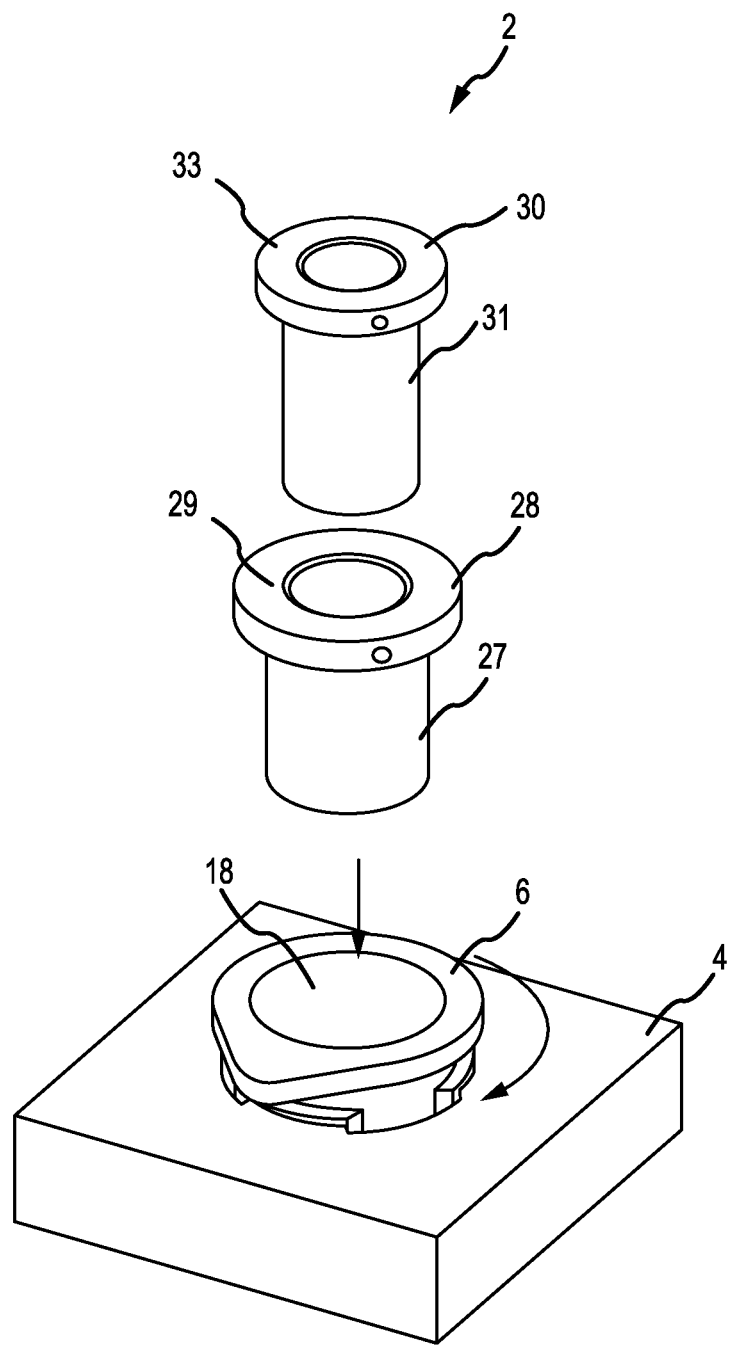
FIG. 1D illustrates a view of an adjustable height fastener with the extendible member inside the fixed receiver and having an outer offset sleeve and an inner offset sleeve, in accordance with various embodiments.
Figure 2:
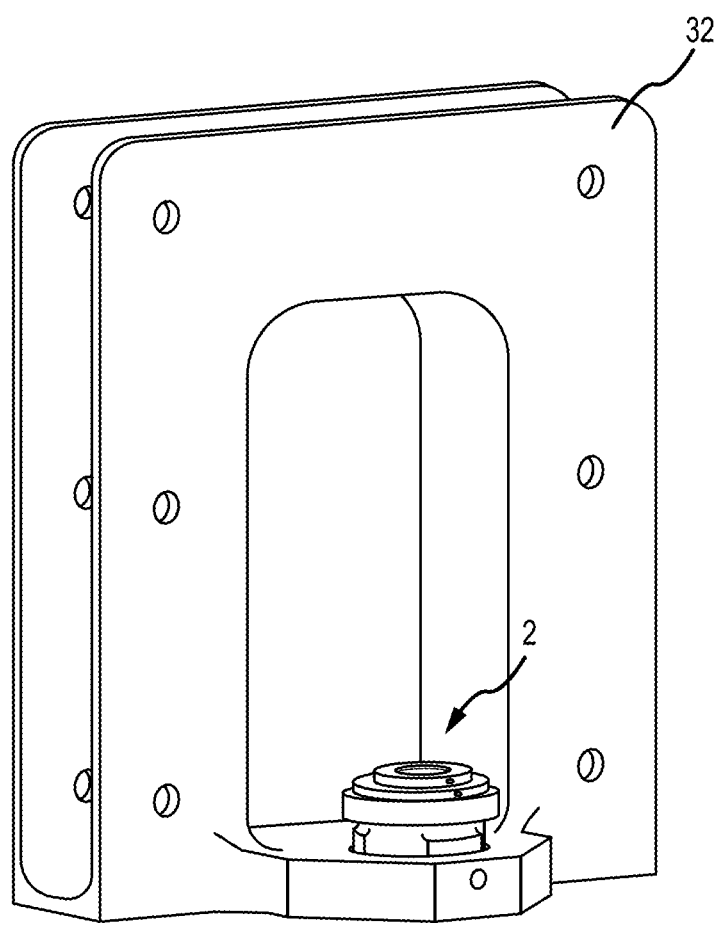
FIG. 2 illustrates a detailed view of an adjustable height fastener installed in connection with a removable device, in accordance with various embodiments.

The detailed description of exemplary embodiments herein refers to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

With reference to FIGS. 1A-D, an adjustable height fastener 2 is provided. An adjustable height fastener 2 may join two structures together. For instance, a removable structure such as a lavatory unit or aircraft passenger seat may be joined to a fixed structure such as an aircraft cabin floor. The structures that are joined may also include closets, galleys, class dividers, and other monuments or structures. The fixed structure 36 may more specifically, be a seat track 3 (also referred to herein as seat rail 3) (FIGS. 3 and 5) that connects to the adjustable height fastener 2. In various instances, the fastener 2 may be adjustable to change a spacing between the removable structure and the fixed structure. The fastener 2 may be adjustable to lengthen or shorten the fastener 2 along a first axis 7 to change a spacing between the removable structure and the fixed structure. The fastener 2 may be adjusted, then fixed in position, prior to connection of the removable structure to the fixed structure via the fastener 2. In this manner, the removable structure may be installed in view-restricted or confined spaces with relative ease.

Figure 3:
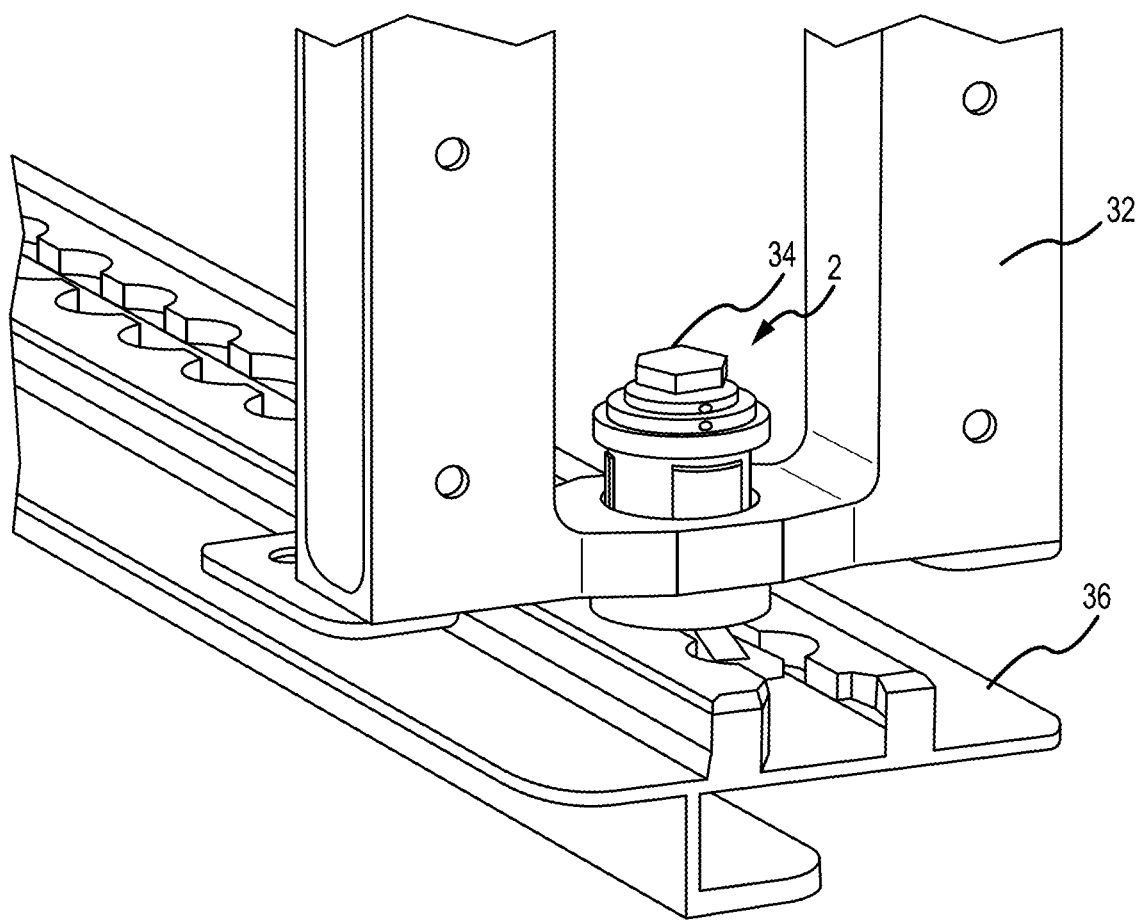
FIG. 3 illustrates a detailed view of an adjustable height fastener connecting a removable device to a seat-rail track, in accordance with various embodiments.

The adjustable height fastener 2 may include a fixed receiver 4 and an extendible member 6. The fixed receiver 4 may be a cylindrical structure, or a plate structure, or another structure providing support and having an aperture to receive an extendible member. The fixed receiver 4 may be attached to the fixed structure such as the seat track 3 (FIG. 3). The adjustable height fastener 2 may include an extendible member 6. The extendible member 6 may connect to the fixed receiver 4. The extendible member may be a shaft, or may be a cylindrical shaft or may be another structure connectable to the fixed receiver such as by insertion at least partially into an aperture of the fixed receiver 4. The connection of the extendible member 6 and the fixed receiver 4 may be adjusted along a first axis 7. For instance, the extendible member 6 and the fixed receiver 4 may be connected at different locations so that the extendible member 6 extends a greater or lesser distance along the first axis 7. In various instances, the extendible member 6 and the fixed receiver 4 both have threaded aspects that may be aligned to join together and that may be unaligned, to allow sliding of the extendible member 6 along the first axis 7 relative to the fixed receiver 4. By adjusting the engagement of the threads of the extendible member 6 with the threads of the fixed receiver 4, the members may be connected at different locations so that the extendible member 6 extends a greater or lesser distance along the first axis 7.

The fixed receiver 4 may include an aperture 8 and the extendible member 6 may have a shaft 12. The fixed receiver 4 may be attachable to a fixed structure and may receive at least a portion of the extendible member 6 into the aperture 8. For instance, the shaft 12 of the extendible member 6 may be received into the aperture 8. The shaft may be positioned relatively more or less inside the aperture 8 so that the extendible member 6 is positioned relatively closer or farther from the fixed receiver 4 along the first axis 7. Moreover, in various instances, the extendible member 6 may be freely slidable into and out of the aperture 8, then twisted and fixed in non-sliding relation to the fixed receiver 4. In this manner, the distance that the extendible member 6 extends along the first axis 7 may be easily adjusted, then fixed.

The selectable adjustment and fixation may be provided by selectable connection and disconnection of corresponding features on the fixed receiver 4 and the extendible member 6. For example, the fixed receiver 4 may have a first attachment face 10. The first attachment face 10 may be an inward annular face of the aperture 8. The extendible member 6 may have a second attachment face 14. The second attachment face 14 may be an outward annular face of the shaft 12.

The first attachment face 10 may have a first threaded portion 20 and a first slidable portion 22. Similarly, the second attachment face 14 may have a second threaded portion 24 and a second slidable portion 26. When the first threaded portion 20 is threadably engaged with the second threaded portion 24, a distance of the extendible member 6 along the first axis 7 is fixed. When the first threaded portion 20 is not threadably engaged with the second threaded portion 24, then the distance of the extendible member 6 along the first axis 7 is adjustable by sliding of the shaft 12 of the extendible member 6 into and out of the aperture 8 of the fixed receiver 4. In various embodiments, aligning of the second threaded portion 24 with the first slidable portion 22 disengages the respective threads and facilitates the sliding. Similarly, an alignment of the first threaded portion 20 with the second slidable portion 26 disengages the respective threads and facilitates the sliding.

In various embodiments, the first threaded portion 20 and the second threaded portion 24 may be helical threads so that a relative positioning of the extendible member 6 along the first axis 7 is finely adjustable, and/or compressive or tensile loading may be exerted by the threads. In other embodiments, the first threaded portion 20 and the second threaded portion 24 are circumferential interlocking grooves (circumferential threads) so that the relative positioning of the extendible member 6 along the first axis 7 and/or compressive or tensile loading is fixed for an engaged set of threads. Moreover, the length of the first threaded portion 20, the second threaded portion 24, the first slidable portion 22, and the second slidable portion 26 may be selected to facilitate differing numbers of potential engagements and disengagements of the threads as the extendible member 6 and the fixed receiver 4 are adjusted.

In various embodiments, the extendible member 6 has an adjustment portion 16. An adjustment portion may be a boss at an end of the extendible member 6. The boss may be knurled or tear-drop shaped (FIG. 1A), or otherwise oriented for grasping by a hand or a tool. In various instances, the boss is a hexagonal boss (FIG. 1B) such as a bolt head for grasping by a wrench or socket. The adjustment portion 16 may also have a locking feature, such as a hole to receive safety wire, a pin, or the like to prevent inadvertent disengagement of the first threaded portion 20 and the second threaded portion 24.

Moreover, the extendible member 6 may have a fastener channel 18. A fastener channel 18 may be an aperture through the extendible member 6 to receive a fastener 34. The fastener may connect a removable device to the fixed structure, with a spacing provided by the extension of the extendible member 6 along the first axis 7.

In various instances, the adjustable height fastener 2 also includes one or more offset sleeves. For instance, an outer offset sleeve 28 may be inserted into a fastener channel 18. Outer offset sleeve 28 may comprise a tube portion 27. Outer offset sleeve 28 may comprise an annual collar 29 extending from tube portion 27 at a first end of outer offset sleeve 28. An inner offset sleeve 30 may be inserted into the outer offset sleeve 28. Inner offset sleeve 28 may comprise a tube portion 31. Inner offset sleeve 30 may comprise an annual collar 33 extending from tube portion 31 at a first end of inner offset sleeve 30. A fastener may pass through the combination of sleeves. An aperture of one or more of the sleeves that receives the fastener may be offset from a center of the sleeve. In this manner, the union of the adjustable height fastener 2 and a bolt or screw or other fastener passing through the aperture of the sleeve may be finely adjusted from side to side according to the offset of the offset sleeves.

Figure 4:
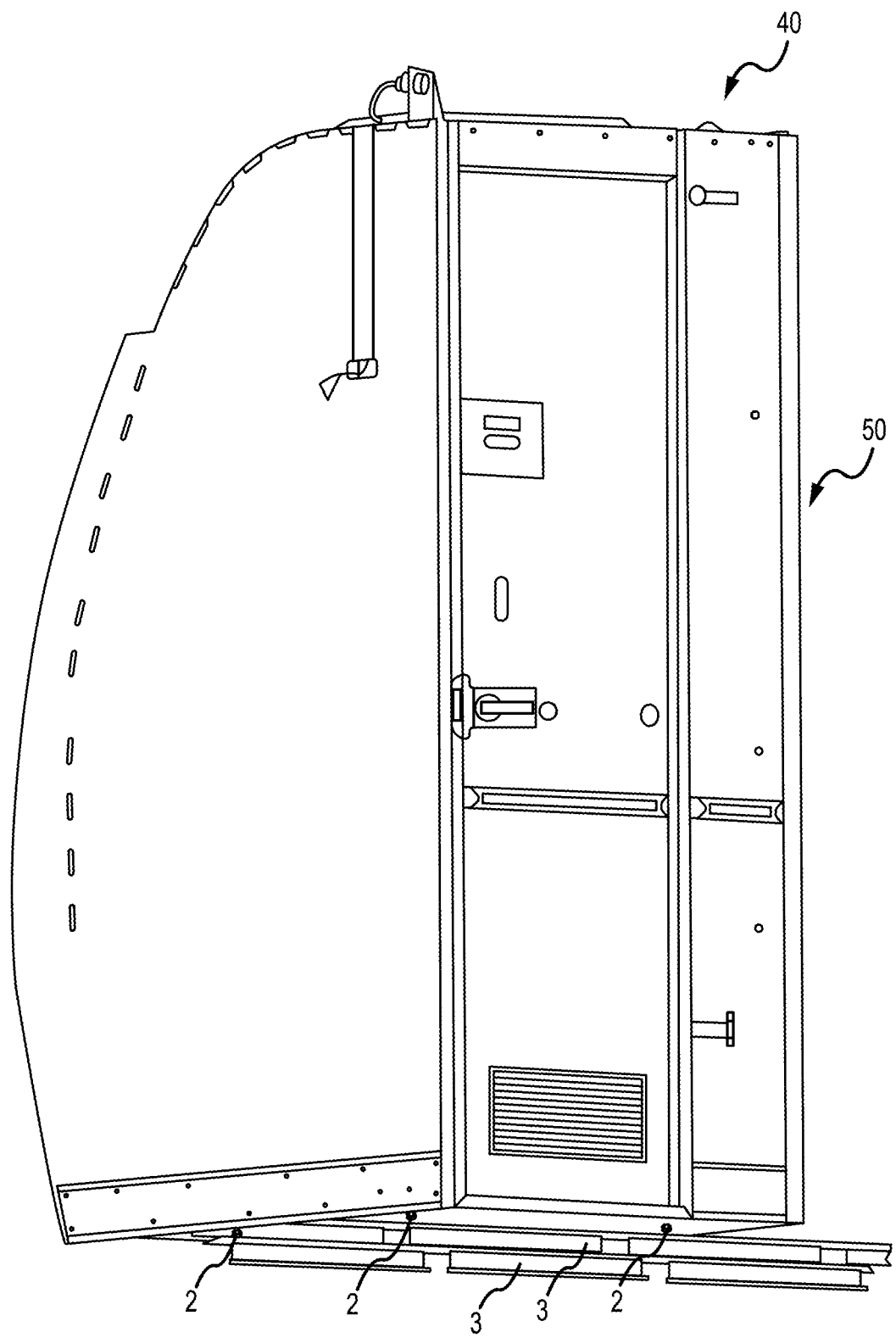
FIG. 4 illustrates an aircraft lavatory unit installed onto seat rails by adjustable height fasteners in accordance with various embodiments.
Figure 5:
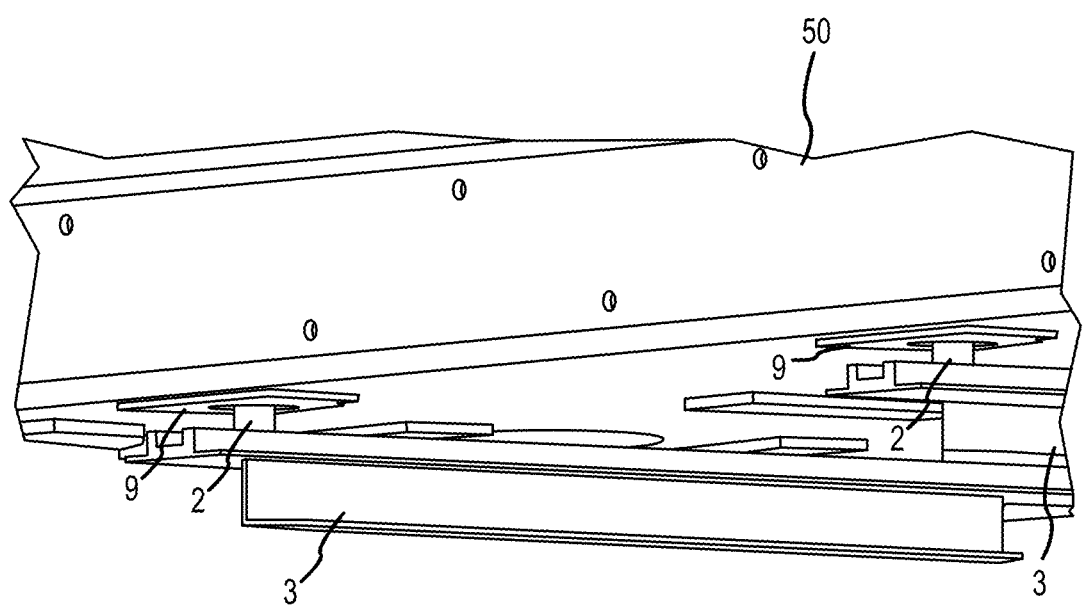
FIG. 5 illustrates a closeup view of the adjustable height fasteners of FIG. 4, in accordance with various embodiments.

FIG. 3 illustrates a practical implementation of the adjustable height fastener 2. An example adjustable height fastener 2 is illustrated connecting a removable device 32 to a fixed structure 36 via a fastener 34 received therein. FIG. 4 illustrates another practice example of adjustable height fasteners 2. A removable aircraft lavatory system 40 is shown. The system 40 includes a removable structure 50, such as an aircraft lavatory, or aircraft seat, that may be mounted to a fixed element such as seat tracks 3 of the aircraft cabin floor. Multiple adjustable height fasteners 2 may be disposed between the seat tracks 3 and the removable structure 50 and connect the removable structure to the seat tracks 3. FIG. 5 illustrates a closeup view of the adjustable height fasteners 2 between the seat tracks 3 and the removable structure 50.

Referring to FIGS. 1A-D and to FIGS. 4-5, in various embodiments, a removable aircraft lavatory system 40 includes a removable structure 50 such as a modular aircraft lavatory configured for installation and removal from an aircraft passenger cabin having a plurality of floor-mounted seat rails 3. A plurality of adjustable height fasteners 2 are placed between the modular aircraft lavatory (removable structure 50) and the plurality of floor-mounted seat rails 3 and configured to attach the modular aircraft lavatory (removable structure 50) to the plurality of floor-mounted seat rails 3. A fastener 2 may be receivable into a bracket 9 associated with a removable structure 50 connectable to the fixed structure 36 by the adjustable height fastener 2.

Each adjustable height fastener 2 of the plurality of adjustable height fasteners comprises a fixed receiver 4 connectable to a floor-mounted seat rail 3 of the plurality of floor-mounted seat rails 3 and an extendible member 6 connectable to the fixed receiver 24 at different locations along a first axis 7 (FIGS. 1A-1B) extending away from a floor of the aircraft passenger cabin.

The fixed receiver 4 has a first attachment face 10 with a first threaded portion 20 and a first slidable portion 22. The extendible member has a second attachment face 14 with a second threaded portion 24 and a second slidable portion 26. The second threaded portion 24 is connectable to the first threaded portion 20 to attach the fixed receiver 4 to the extendible member 6 at different locations along a first axis extending away from a floor of the aircraft cabin, the different locations including a first location. In various instances, the first location is selected to space the modular aircraft lavatory away from the floor-mounted seat rail.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An adjustable height fastener system comprising:
a fixed structure;
a fixed receiver having a first attachment face with a first threaded portion and a first slidable portion, the fixed receiver connectable to the fixed structure; and
an extendible member having a second attachment face with a second threaded portion and a second slidable portion, the second threaded portion connectable to the first threaded portion to attach the fixed receiver to the extendible member at different locations along a first axis, and having an adjustment portion comprising a boss disposed at an end of the extendible member and configured for grasping with at least one of a hand and a tool to rotate the extendible member to disconnect the second threaded portion from the first threaded portion and to move the extendible member along the first axis;
at least one offset sleeve (1) insertable into an aperture of the extendible member, (2) configured to receive a component fastener to connect a removable device to the fixed structure, and (3) having a first annular collar configured to compress against the boss at the end of the extendible member in an inserted position,
wherein an attachment of the fixed receiver to the extendible member is released in response to a rotation of the extendible member so that the second threaded portion is disconnected from the first threaded portion.

2. The adjustable height fastener system according to claim 1, wherein the first attachment face is an inward annular surface of an aperture through the fixed receiver.

3. The adjustable height fastener system according to claim 2, wherein the second attachment face is an outward annular surface of a portion of the extendible member insertable into the aperture through the fixed receiver.

4. The adjustable height fastener system according to claim 1, further comprising a component fastener attaching a removable structure to the extendible member, the extendible member spacing the removable structure away from the fixed structure, the spacing being variable in response to attaching the fixed receiver to the extendible member at the different locations along the first axis.

5. An adjustable height fastener system comprising:
a fixed receiver connected to a fixed structure and having a first threaded portion and a first slidable portion;
an extendible member having a first aperture, a first adjustment portion disposed at a first end of the aperture and configured for grasping with at least one of a hand and a tool to rotate the extendible member, a second threaded portion, and a second slidable portion, the second threaded portion selectably (1) attachable to the first threaded portion to fix the extendible member extending away from the fixed receiver a first distance along a first axis, and (2) alignable to the first slidable portion to permit movement of the extendible member further along the first axis; and
at least one offset sleeve (1) insertable into the aperture of the extendible member, (2) configured to receive a component fastener to connect a removable structure to the fixed structure, and (3) having a first annular collar configured to compress against the first adjustment portion at the first end of the extendible member in an inserted position.

6. The adjustable height fastener system according to claim 5, wherein the fixed structure is a seat track of an aircraft cabin.

7. The adjustable height fastener system according to claim 6, wherein the removable structure is connected to at least one of the extendible member and the fixed receiver and is spaced apart from the fixed structure by a combination of an extendible member collar and the fixed receiver.

8. The adjustable height fastener system according to claim 7, wherein the removable structure is an aircraft lavatory.

9. The adjustable height fastener system according to claim 7, wherein the removable structure is an aircraft passenger seat.

10. The adjustable height fastener system according to claim 5, further comprising a fastener receivable into a bracket associated with a removable structure connectable to the fixed structure by the adjustable height fastener system.

11. The adjustable height fastener system according to claim 5, wherein the adjustment portion comprises a hexagonal bolt head.

12. The adjustable height fastener system according to claim 5, wherein the fixed structure is an aircraft seat track.

13. A removable aircraft lavatory system comprising:
a modular aircraft lavatory configured for installation and removal from an aircraft passenger cabin having a plurality of floor-mounted seat rails; and
a plurality of adjustable height fastener tools placed between the modular aircraft lavatory and the plurality of floor-mounted seat rails and configured to attach the modular aircraft lavatory to the plurality of floor-mounted seat rails,
wherein each adjustable height fastener tool of the plurality of adjustable height fastener tools comprises:
a fixed receiver having a first attachment face with a first threaded portion and a first slidable portion, the fixed receiver connectable to a floor-mounted seat rail of the plurality of floor-mounted seat rails; and an extendible member having a second attachment face with a second threaded portion and a second slidable portion, the second threaded portion connectable to the first threaded portion to attach the fixed receiver to the extendible member at different locations along a first axis extending away from a floor of the aircraft passenger cabin, the different locations including a first location selected to space the modular aircraft lavatory away from the floor-mounted seat rail, and having a boss disposed at an end of the extendible member and configured for grasping with at least one of a hand and a tool to rotate the extendible member to disconnect the second threaded portion from the first threaded portion and to move the extendible member to the different locations; and at least one offset sleeve (1) insertable into an aperture of the extendible member, (2) configured to receive a component fastener to connect the modular aircraft lavatory to at least one of the plurality of floor-mounted seat rails, and (3) having a first annular collar configured to compress against the boss at the end of the extendible member in an inserted position.

14. The removable aircraft lavatory system according to claim 13, wherein the first attachment face is an inward annular surface of an aperture through the fixed receiver.

15. The removable aircraft lavatory system according to claim 14, wherein the second attachment face is an outward annular surface of a portion of the extendible member insertable into the aperture through the fixed receiver.

16. The removable aircraft lavatory system according to claim 13, wherein the extendible member further comprises an adjustment portion comprising a boss disposed at an end of the extendible member and configured for grasping with at least one of a hand and a tool to rotate the extendible member to disconnect the second threaded portion from the first threaded portion and to move the extendible member along the first axis to adjust a spacing of the modular aircraft lavatory away from the floor-mounted seat rail.

\* \* \* \* \*